United States Patent
Kainz et al.

(10) Patent No.: US 10,450,977 B2
(45) Date of Patent: Oct. 22, 2019

(54) VALVE CONTROL PROCESSES FOR AN INTERNAL COMBUSTION ENGINE

(71) Applicant: Continental Automotive GmbH, Hannover (DE)

(72) Inventors: Josef Kainz, Salching (DE); Tobias Braun, Undorf (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 74 days.

(21) Appl. No.: 15/319,090

(22) PCT Filed: Jun. 17, 2015

(86) PCT No.: PCT/EP2015/063547
§ 371 (c)(1),
(2) Date: Dec. 15, 2016

(87) PCT Pub. No.: WO2015/197440
PCT Pub. Date: Dec. 30, 2015

(65) Prior Publication Data
US 2017/0198649 A1    Jul. 13, 2017

(30) Foreign Application Priority Data

Jun. 25, 2014   (DE) .......................... 10 2014 212 164
May 27, 2015   (DE) .......................... 10 2015 209 665

(51) Int. Cl.
*F02D 41/00*   (2006.01)
*F02D 41/24*   (2006.01)
(Continued)

(52) U.S. Cl.
CPC ....... *F02D 41/009* (2013.01); *F02D 13/0203* (2013.01); *F02D 13/0207* (2013.01);
(Continued)

(58) Field of Classification Search
CPC .................. F02D 2041/286; F02D 2041/0288
See application file for complete search history.

(56) References Cited

U.S. PATENT DOCUMENTS 6,478,000 B2 * 11/2002 Ishii ........................ F01L 1/34
                                                          123/90.15
6,804,997 B1   10/2004 Schwulst ................... 73/114.37
(Continued)

FOREIGN PATENT DOCUMENTS

CN    1336481 A    2/2002   ................ F01L 1/34
DE    3506114 A1   9/1986   ............. F02D 41/14
(Continued)

OTHER PUBLICATIONS

International Search Report and Written Opinion, Application No. PCT/EP2015/063547, 20 pages, dated Oct. 5, 2015.
(Continued)

*Primary Examiner* — Sizo B Vilakazi
*Assistant Examiner* — Kevin R Steckbauer
(74) *Attorney, Agent, or Firm* — Slayden Grubert Beard PLLC

(57) ABSTRACT

The present disclosure relates to internal combustion engines and its teachings may be embodied in methods for controlling and identifying valve control times of an internal combustion engine. Some embodiments may include a method comprising: measuring dynamic pressure oscillations in the inlet section or outlet section of the respective series-production engine; determining a crankshaft-position feedback signal; determining the phase angles of selected signal frequencies using discrete Fourier transformation; and determining the valve control times of the respective series-production internal combustion engine based on the determined phase angles, the reference phase angles, and reference valve control times with the same signal frequencies of the pressure oscillations of a reference internal
(Continued)

combustion engine or of a model function derived therefrom.

7 Claims, 1 Drawing Sheet

(51) Int. Cl.
*F02D 13/02* (2006.01)
*F02D 41/14* (2006.01)
*F02D 41/28* (2006.01)

(52) U.S. Cl.
CPC ..... *F02D 13/0215* (2013.01); *F02D 13/0219* (2013.01); *F02D 41/1448* (2013.01); *F02D 41/2429* (2013.01); *F02D 41/2432* (2013.01); *F02D 41/28* (2013.01); *F02D 13/02* (2013.01); *F02D 13/0223* (2013.01); *F02D 13/0234* (2013.01); *F02D 13/0242* (2013.01); *F02D 41/0002* (2013.01); *F02D 41/2464* (2013.01); *F02D 2041/001* (2013.01); *F02D 2041/1433* (2013.01); *F02D 2041/288* (2013.01); *F02D 2200/0402* (2013.01); *F02D 2200/0406* (2013.01); *Y02T 10/18* (2013.01)

(56) References Cited

U.S. PATENT DOCUMENTS

| | | | | |
|---|---|---|---|---|
| 6,912,995 B2* | 7/2005 | Miura | ............... | F01L 13/0026 123/435 |
| 7,213,550 B2* | 5/2007 | Nishida | ............... | F01L 9/04 123/347 |
| 7,634,940 B2* | 12/2009 | Hartmann | ............... | F02D 41/221 73/114.37 |
| 7,921,709 B2* | 4/2011 | Doering | ............... | F02D 13/06 73/114.37 |
| 8,762,032 B2* | 6/2014 | Loeffler | ............... | F02D 13/0246 701/109 |
| 9,347,413 B2* | 5/2016 | Schule | ............... | F01L 13/0015 |
| 9,371,794 B2* | 6/2016 | Schule | ............... | F02D 13/0226 |
| 9,800,180 B2 | 10/2017 | Sumioka | | |
| 2004/0129238 A1* | 7/2004 | Nishida | ............... | F01L 9/04 123/90.11 |
| 2005/0039723 A1* | 2/2005 | Miura | ............... | F01L 13/0026 123/435 |
| 2008/0236267 A1* | 10/2008 | Hartmann | ............... | F02D 41/221 73/114.37 |
| 2009/0182491 A1 | 7/2009 | Bauer et al. | ............... | 701/115 |
| 2009/0312932 A1* | 12/2009 | Wang | ............... | F02D 35/024 701/102 |
| 2010/0063775 A1 | 3/2010 | Colling | ............... | 702/182 |
| 2010/0175463 A1* | 7/2010 | Doering | ............... | F02D 13/06 73/114.37 |
| 2011/0041787 A1* | 2/2011 | Loeffler | ............... | F02D 13/0246 123/90.15 |
| 2011/0137509 A1* | 6/2011 | Sarac | ............... | F02D 13/02 701/31.4 |
| 2013/0006492 A1* | 1/2013 | Iwatani | ............... | F02D 41/0002 701/102 |
| 2013/0180505 A1* | 7/2013 | Schule | ............... | F01L 13/0015 123/445 |
| 2013/0206108 A1* | 8/2013 | Schule | ............... | F02D 13/0226 123/435 |
| 2013/0253802 A1* | 9/2013 | Miyamoto | ............... | F02D 43/04 701/103 |
| 2017/0226970 A1* | 8/2017 | Ford | ............... | F02M 35/10118 |
| 2017/0292461 A1* | 10/2017 | Zhang | ............... | F02D 41/009 |

FOREIGN PATENT DOCUMENTS

| | | | | |
|---|---|---|---|---|
| DE | 102005007057 A1 | 8/2006 | ............ | F02D 41/18 |
| DE | 102007023849 A1 | 11/2008 | ............ | F02D 13/02 |
| JP | 2012115102 A | 6/2012 | ............ | H02N 2/00 |
| WO | 2015/197440 A1 | 12/2015 | ............ | F02D 13/02 |

OTHER PUBLICATIONS

JP 2012115102 A U.S. Pat. No. 9,800,180 B2.
Korean Notice of Allowance, Application No. 2018023073257, 3 pages, dated Apr. 2, 2018.
CN 1336481 A U.S. Pat. No. 6,478,000 B2.
Chinese Office Action, Application No. 201580034330.5, 13 pages, dated Dec. 5, 2018.

* cited by examiner

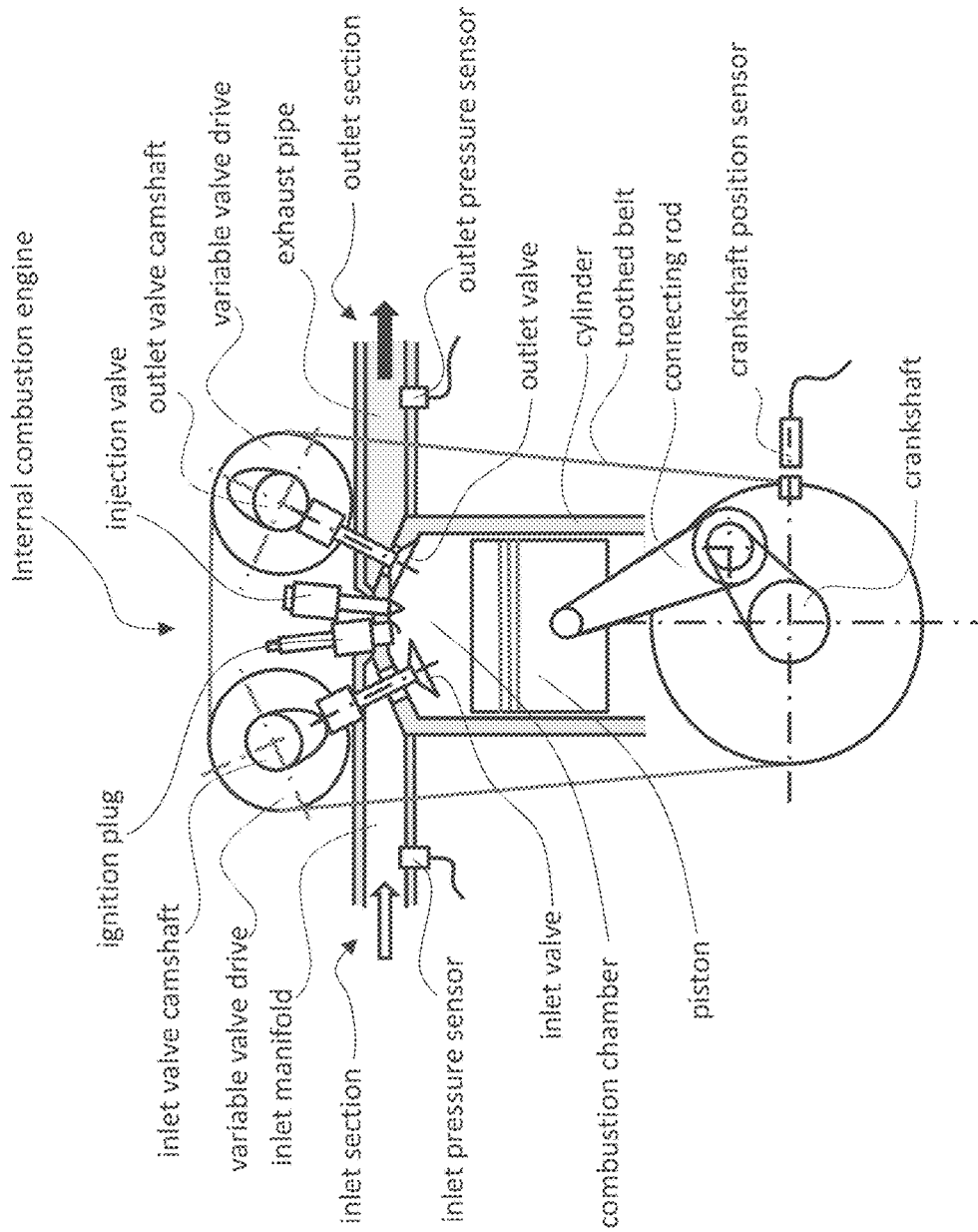

VALVE CONTROL PROCESSES FOR AN INTERNAL COMBUSTION ENGINE

CROSS-REFERENCE TO RELATED APPLICATIONS

This application is a U.S. National Stage Application of International Application No. PCT/EP2015/063547 filed Jun. 17, 2015, which designates the United States of America, and claims priority to DE Application No. 10 2014 212 164.7 filed Jun. 25, 2014 and DE Application No. 10 2015 209 665.3 filed May 27, 2014, the contents of which are hereby incorporated by reference in their entirety.

TECHNICAL FIELD

The present disclosure relates to internal combustion engines and its teachings may be embodied in methods for controlling and identifying valve control times of an internal combustion engine.

BACKGROUND

Combustion cycles for internal combustion engines may include a plurality of working strokes. During what is referred to as the intake stroke, the working chamber is filled with a fresh gas charge (air or air/exhaust gas). During what is referred to as the expulsion stroke the working chamber is emptied. The delimitation of the working chamber or combustion chamber with respect to the intake section or exhaust gas section of the machine is usually implemented by means of valves (in the case of two-stroke engines or else by means of what are referred to as control slits).

Typically, these valves are actuated by means of at least one camshaft. Between the valve and the camshaft there are usually also mechanical components for transmitting force, including valve play compensation (e.g., bucket tappet, toggle lever, rocker lever, push rod, hydraulic tappet, etc.). The camshaft or shafts are driven via the internal combustion engine itself. For this purpose, the camshaft or shafts is/are connected to the crankshaft by means of suitable adapters using a toothed belt or a control chain. The position of the crankshaft with respect to the position of the camshaft or shafts is defined by this connection (control times). Within this control link, actuating elements may adjust a desired phase offset between the crankshaft or shafts and camshaft or shafts.

These actuating elements are known as phase shifters for variable valve drive (VVD). For optimized operation of the internal combustion engine (with respect to emissions, consumption, power, smooth running etc.), the fresh gas charge which is taken in during the intake stroke should be known as accurately as possible. This fresh gas charge is dependent on the selected control times (inlet valve and outlet valve or control slits).

A reference internal combustion engine is measured in each of the operating states which occur (rotational speed, load, actuation of all the actuators, different valve strokes, actuation of flaps, actuation of the phase shifters for the inlet and outlet valves, exhaust gas turbocharger, compressor, etc.) and these measured values (or derivatives therefrom or model approaches which represent the behavior) are stored in the engine control unit of a corresponding series-production internal combustion engine. All the structurally identical, series-produced internal combustion engines of the same series are then operated with this generated reference data set.

A deviation of the actual relative position between the camshaft and the crankshaft from the reference position (deviation of the control times) at a series-production internal combustion engine causes the actually taken-in fresh gas charge to differ from the fresh gas charge which is determined as a reference. An angular offset of individual cams on the camshaft (compared with the reference angle determined at the reference internal combustion engine) brings about here the same fault pattern as an angular offset of the camshaft and crankshaft (compared with the reference position determined at the reference internal combustion engine). During the operation of the engine, these faults can result in negative effects with respect to emissions, consumption, power, smooth running etc.

Possible causes for the described deviations can be
- angular deviation of the aimed-at relative position between the camshaft and the corresponding coupling elements such as, e.g., drive toothed wheel or drive pulley, compared to the reference position during assembly or as a result of fabrication tolerances, and angular deviation with respect to the aimed-at phase angle offset of the individual cams on the camshaft with respect to one another during assembly or as a result of fabrication tolerances, and/or
- lengthening of the control chain or of the toothed belt by means of which the camshaft and the crankshaft are coupled.

Typically, the solution of the described problem is the detection and quantification of the deviations which occur between the reference internal combustion engine and the series-production internal combustion engine in order to be able to carry out corresponding measures for correction or compensation.

In order to counteract this problem, it has previously been attempted to minimize the fabrication tolerances as far as possible, for example the camshafts and the corresponding coupling elements are assembled with mechanical aids. In addition, the control times are measured on the respective stationary series-production internal combustion engine on the basis of valve stroke adjustment, cam contour, etc., and the internal combustion engine is adjusted during assembly.

Most currently known systems operate with a reference point system (position feedback). Here, in each case a position mark, which can be detected with a sensor, is placed at any desired point on the camshaft or a coupling element or a possibly present phase shifter etc., and, for example, on the flywheel of the crankshaft. As a result, the relative position between the crankshaft and the camshaft can be determined and deviations from the aimed at reference values can be identified. The undesired effects of these deviations can then be compensated in the control unit by adapting or correcting corresponding control variables as a function of the determined deviations.

However, only some of the tolerances which occur can be detected. For example, it is not possible to detect an angular deviation owing to a deviation of the position of the camshaft encoder wheel with respect to the camshaft or an angular deviation with respect to the aimed-at phase angle offset of the individual cams with respect to one another during assembly or as a result of fabrication tolerances (cylinder-specific deviation).

Further methods, such as evaluation of the knocking sensor signal or evaluation of the cylinder pressure signal, are also known. For example, U.S. Pat. No. 6,804,997 B1 discloses an engine control device for determining the crankshaft position and the engine phase by monitoring intake air pressure oscillations. The control device determines intake air pressure oscillations which indicate an intake air event and therefore a specific crankshaft position as well as its corresponding period of the engine cycle. The control device uses this information to determine the crankshaft rotational speed and crankshaft position to control the fuel injection and the ignition behavior of the engine.

Furthermore, document DE 10 2005 007 057 discloses a regulating method for a throttle-valve airflow to be regulated, in the intake section of an internal combustion engine, wherein pressure pulsations in the intake section, which pulsations are also influenced, inter alia, by the valve control times of the internal combustion engine, are taken into account during the regulation of the fluid flow. For this purpose, the pressure pulsations are analyzed by means of fast Fourier transformation, and the amplitude information is combined in a distortion factor which is used as an additional input variable, for example, for a multi-dimensional mathematical regulating model of the throttle-valve airflow. Specific conclusions about the valve control times of the internal combustion engine cannot be drawn by means of this method.

Document DE 35 06 114 A1 discloses a method for performing open-loop or closed-loop control of an internal combustion engine in which at least one manipulated variable of the internal combustion engine is controlled as a function of an operating variable which contains at least part of an oscillation spectrum of the internal combustion engine as information, such as for example, gas pressure signals. For this purpose the value spectrum contained in the detected operating variable is determined therefrom, as part of the oscillation spectrum, by discrete Fourier transformation and is used as a measurement spectrum and compared with a reference spectrum. That manipulated variable of the internal combustion engine which is to be controlled is then controlled as a function of the deviation between the measurement spectrum and the reference spectrum. A specific conclusion about the valve control times of the internal combustion engine cannot easily be drawn either using this method.

Document US 2009 0 312 932 A1 discloses a method for diagnosing the combustion within an internal combustion engine, wherein a combustion phase-adjustment value is generated from the crankshaft angular speed by means of a fast Fourier transformation, and this value is compared with an expected combustion phase-adjustment value, and differences between these values which are greater than a permissable combustion phase-adjustment difference are identified. A similar procedure for determining deviations between a reference engine and a series-production engine as described above is also disclosed in document US 2010 0 063 775 A1.

SUMMARY

The present disclosure may be embodied in simple and cost-effective methods which provide particularly precise identification of the valve control times. For example, a method for identifying valve control times of a series-production internal combustion engine, wherein dynamic pressure oscillations in the inlet section and/or outlet section of the respective series-production internal combustion engine are measured and a crankshaft-position feedback signal is additionally determined, may include: the phase angles of selected signal frequencies of the measured pressure oscillations are determined from the measured pressure oscillations and the crankshaft-position feedback signal using discrete Fourier transformation, and on the basis of the determined phase angles, the valve control times of the respective series-production internal combustion engine are determined using reference phase angles and reference valve control times with the same signal frequencies of the pressure oscillations of a reference internal combustion engine and/or of a model function derived therefrom.

In some embodiments, the determined valve control times are compared with reference valve control times of the reference internal combustion engine and corrected to the reference valve control times, or further control variables or control routines are adapted to the determined valve control times in the engine controller.

In some embodiments, said method comprises the following preceding steps: measuring a reference internal combustion engine in order to determine reference phase angles of selected signal frequencies of the pressure oscillation signal in the inlet section and/or outlet section during reference valve control times; and storing the reference phase angles and reference valve control times on an engine control unit of the respective series-production internal combustion engine.

In some embodiments, a model function which models the relationship between the phase angles of the selected signal frequencies of the pressure oscillation signal and the valve control times is derived from the reference phase angles of the selected signal frequencies of the pressure oscillation signal and the assigned reference valve control times.

In some embodiments, the measurement of the reference internal combustion engine comprises the following steps: measuring dynamic pressure oscillations in the inlet section and/or outlet section of the reference internal combustion engine, in each case over a working cycle during the control time StZ_RefMo_0 without a control time shift and during at least one further control time StZ_RefMo_RefV_with a defined reference control time shift; determining at least one phase angle PhW_RefMo_0 for the control time StZ_RefMo_0 and at least one phase angle PhW_RefMo_RefV for at least one of the control times StZ_RefMo_RefV using a discrete Fourier transformation for the selected signal frequencies of the pressure oscillations.6

In some embodiments, the method may include: measuring the dynamic pressure oscillations in the inlet section and/or outlet section of the respective series-production internal combustion engine, determining the given phase angles PhW_SeMo_Act using a discrete Fourier transformation for the selected signal frequencies of the pressure oscillations and calculating the control time StZ_SeMo_Act to be determined, according to the model function:

StZ_SeMo_Act=StZ_RefMo_0+(StZ_RefMo_RefV−StZ_Ref Mo_0)*((PhW_SeMo_Act−PhW_RefMo_0)/(PhW_RefMo_RefV−PhW_RefMo_0)).

In some embodiments, the selected signal frequencies include the intake frequency and further multiples of the intake frequency.

In some embodiments, the dynamic pressure oscillations are measured using a series-production-type pressure sensor in the intake manifold.

In some embodiments, the crankshaft-position feedback signal is determined with a gearwheel and a Hall sensor.

BRIEF DESCRIPTION OF THE DRAWINGS

The single FIGURE is a drawing showing an example arrangement of portions of an internal combustion engine incorporating teachings of the present disclosure.

DETAILED DESCRIPTION

In some embodiments, dynamic pressure oscillations in the inlet section and/or outlet section of a respective series-production internal combustion engine are measured and a crankshaft-position feedback signal is additionally determined, and the phase angles of selected signal frequencies of the measured pressure oscillations are determined from the measured pressure oscillations and the crankshaft-position feedback signal using discrete Fourier transformation. On the basis of the determined phase angles, the valve control times of the respective internal combustion engine are determined using reference phase angles and associated reference valve control times with the same signal frequencies of the pressure oscillations of a reference internal combustion engine and/or of a model function derived therefrom.

There is a uniquely defined relationship between the control times (inlet and outlet valves or control slits) and the dynamic pressure oscillations in the inlet section and outlet section of the engine. For example, there is such a relationship for the dynamic pressure oscillations in the inlet section of an internal combustion engine and the valve control times of the inlet valves in a VVD internal combustion engine (internal combustion engine with variable valve drive). A phase shift of the camshaft angular position, which has been set by means of a phase shift device, and therefore of the valve control time with respect to the crankshaft angular position results in a measurable shift of the pressure oscillation signal in the intake section. The pressure oscillation signal itself (amplitudes, gradients, etc.) can change. The tolerance-induced or wear-induced deviations described at the beginning would also bring about precisely such a shift.

To analyze the pressure oscillation signal, the latter is subjected to a discrete Fourier transformation (DFT). For this purpose, an algorithm which is known as a fast Fourier transformation (FFT) can be used for efficiently calculating the DFT. By means of DFT, the pressure oscillation signal is then decomposed into individual signal frequencies which can be subsequently analyzed separately in a simplified fashion with respect to their amplitude and the phase position. It has become apparent that the phase position of selected signal frequencies of the pressure oscillation signal is in a dependency relationship with the valve control times of the internal combustion engine. For this purpose, those signal frequencies are used which correspond to the intake frequency, as a fundamental frequency or first harmonic, of the internal combustion engine or a multiple of the intake frequency, that is to say the 2nd to nth harmonic, wherein the intake frequency is again in a uniquely defined relationship with the rotational speed of the internal combustion engine.

For these selected signal frequencies, the phase position, referred to in this context as the phase angle, of the selected signal frequencies with respect to the crankshaft rotational angle is then determined using the crankshaft-position feedback signal which is detected in parallel. To determine the phase position of the valve control times with respect to the crankshaft position on the basis of the signal frequencies of the pressure oscillation signal which are selected individually from the phase angles, determined in this way, the relationship or the dependence of the specified variables on one another must be clearly known. This relationship must therefore be determined in advance by the precise measurement of a reference internal combustion engine of the same design and with the same dimensions.

In the reference internal combustion engine, the phase angles of individual selected signal frequencies of the pressure oscillation signal are determined at different predefined valve control times. These value pairs which are generated in this way can be stored, for example, as a function of various operation points of the internal combustion engine in a corresponding phase angle characteristic diagram. This phase angle characteristic diagram is stored in the engine controller of each corresponding structurally identical series-production internal combustion engine. During operation of the series-production internal combustion engine, it is then possible, on the basis of the determined phase angles of the same signal frequencies, to use the stored phase angle characteristic diagram and/or the corresponding reference phase angles, to determine the associated valve control times.

Some embodiments use the phase angles, determined on the reference internal combustion engine at specific control times, of the selected signal frequencies to derive an associated model function and/or computational model, and then store this model function in the engine controller of the series-production internal combustion engine. Depending on the configuration and scope of the model function, it can be used alone or in conjunction with a phase angle characteristic diagram, if appropriate reduced in scope, to determine the valve control times on the basis of the determined phase angles.

In some embodiments, the determined valve control times are compared with reference valve control times of the reference internal combustion engine and, in the case of deviations occurring, corrected to the reference valve control times, or the engine controller is adapted to the actual determined valve control times. A correction of the valve control times can be carried out by means of the engine controller in so far as the internal combustion engine has a phase shifter for the camshaft. Otherwise, further control variables or control routines such as, for example, injection times, injection quantities, ignition times, etc. can be adapted to the determined valve control times in the engine controller, to ensure efficient operation of the internal combustion engine with little generation of exhaust gas.

As a result, it is possible to identify and quantify a deviation from the predefined reference values which result, as described at the beginning, from the measurement of a reference internal combustion engine. All structurally identical series-production internal combustion engines which are to be found in the field can therefore be subjected, by means of the described method, to a corresponding individual correction with respect to the valve control times.

In some embodiments, such a method can comprise:
measuring a reference internal combustion engine; and
determining reference phase angles of the pressure oscillation signal in the inlet section and/or outlet section during reference valve control times;
storing the reference phase angles and reference valve control times on a control unit of the respective series-production internal combustion engine, for example in the form of a phase angle characteristic diagram;
measuring the dynamic pressure oscillations in the inlet section and/or outlet section as well as the crankshaft-position feedback signal of the series-production internal combustion engine and derivation of the actual valve control times therefrom by
determining the phase angles of selected signal frequencies from the pressure oscillations measured at the series-production internal combustion engine and the crankshaft-position feedback signal using discrete Fourier transformation, and determining the valve control times of the respective series-production internal combustion engine on the basis of the determined phase angles using the reference phase angles and the reference valve control times of the same signal frequencies of the pressure oscillations of the reference internal combustion engine, and detecting deviations which occur between the reference valve control times and the actual valve control times, and carrying out corresponding compensation measures or correction measures of the valve control times with respect to the reference valve control times on the basis of the detected deviations.

The method described above is suitable, in particular, for VVD internal combustion engines, but does not exclude engines with fixed valve control times (4-stroke and 2-stroke engines). In the case of VVD internal combustion engines it is possible for, e.g. active adjustment of the phase position of the camshaft to be carried out with respect to the crankshaft angle position and therefore the valve control times, and therefore for the fault to be corrected. In the case of engines with fixed control times it is possible to access, e.g., in the sequence of control routines, various data sets or characteristic diagrams as a function of the detected deviation of the valve control times and compensate the deviation by this means. Readjustment of the engine or overhauling of individual components after identification and quantification of the deviations is not excluded either (e.g., by means of an error memory entry when very large deviations are detected).

The abovementioned method can be expanded or added to in a further embodiment in such a way that a model function which models the relationship between the phase angles of the selected signal frequencies of the pressure oscillation signal and the valve control times is derived from the reference phase angles of the selected signal frequencies of the pressure oscillation signal and the assigned reference valve control times. The abovementioned relationship between valve control times and dynamic pressure oscillations applies both to the inlet section in combination with the inlet valve or inlet control slit as well as to the outlet section in combination with the outlet valve or outlet control slit. In a coupling of the inlet section with the outlet section, for example by means of valve overlap, external exhaust gas recirculation etc., there can be interactions between the outlet valve and the dynamic pressure in the inlet section, or vice versa. The abovementioned relationship also occurs between control times and dynamic pressure oscillations both in the energized and in the non-energized engine operating modes (e.g., overrun mode when coasting etc.).

The teachings of the present invention may be used to determine the fresh gas charge taken in during the intake stroke. The dynamic pressure oscillations in the inlet section can be measured using a series-production-type pressure sensor which is usually present in any case in the intake manifold, for example a piezo-resistive pressure sensor. The crankshaft-position feedback signal can be determined, for example, in a known fashion with a gearwheel (60-2 gearwheel) and a Hall sensor.

In some embodiments, valve control times may be determined from the signal of the series-production intake manifold pressure sensor. The approaches used hitherto, for example by means of a camshaft encoder signal, can only detect some of the tolerances which occur. For example, it has hitherto not been possible to detect an angular deviation at the cam position on the camshaft. The teachings herein do not require any additional hardware, since an already present intake manifold pressure sensor may be used.

The teachings will be explained below in particular with reference to an exemplary embodiment. The exemplary embodiment is a method for evaluating the relationship between the dynamic pressure oscillations in the inlet section and the valve control time of the inlet valve. However, the teachings may be embodied in methods which evaluate the relationship between the dynamic pressure oscillations in the exhaust gas section and the valve control time of the outlet valve as well as the abovementioned interactions between the inlet section and outlet section through the coupling of the two systems.

The following example for calculating valve control times at an internal combustion engine with a camshaft angle position which can be adjusted in relation to the crankshaft angle by means of a phase shifter is initially based on the measurement of a reference internal combustion engine as follows:

a) measuring the dynamic pressure oscillations in the inlet section and/or outlet section of the reference internal combustion engine over a working cycle with known inlet control times,
StZ_RefMo_0, without a control time shift;

b) repeating the measurement with valve control times which are adjusted by a known reference control time shift, StZ_RefMo_RefV;

c) determining at least one phase angle PhW_RefMo_0 for the control time StZ_RefMo_0 and at least one phase angle PhW_RefMo_RefV for at least one of the control times StZ_RefMo_RefV by means of discrete Fourier transformation of the data from a) and b) for at least one of the selected signal frequencies of the intake manifold pressure signal (e.g. intake frequency and harmonic of the intake frequency) and;

d) storing the reference phase angles and reference valve control times, for example in the form of a phase angle characteristic diagram, in an engine control unit of the respective series-production internal combustion engine.

At the series-production internal combustion engine with an unknown inlet control time StZ_SeMo_Act, this control time can then be determined in a further embodiment of the method by using the reference values, for example from the abovementioned phase angle characteristic diagram, as follows:

1) measuring the dynamic pressure oscillations in the inlet section and/or outlet section of the respective series-production internal combustion engine;

2) determining the given phase angles PhW_SeMo_Act using a discrete Fourier transformation for the selected signal frequencies of the pressure oscillations and 3) calculating the previously unknown inlet control time StZ_SeMo_Act, for example according to the following model function which is based on a linear approach:

StZ_SeMo_Act=StZ_RefMo_0+(StZ_RefMo_RefV−StZ_RefMo_0)*((PhW_SeMo_Act−PhW_RefMo_0)/(PhW_RefMo_RefV−PhW_RefMo_0))

As explained above, a neatly defined relationship is assumed here between the shift of the valve control times and the shift of the phase angle of selected signal frequencies of the pressure oscillation signal, and the linear model function (polynomial first order) illustrated above is derived from the determined reference values of the reference internal combustion engine. This linear model is suitable, in particular, when considering individual reference value groups (StZ_RefMo_0/Phw_RefMo_0 and StZ_RefMo_RefV/PhW_RefMo_RefV). The use of a plurality of reference value groups allows increasing the accuracy of the method. Model functions which are correspondingly derived then result in relatively high order polynomials.

In the text which follows, a practical application of the method will be explained once more using a further example. Firstly, for this purpose a reference internal combustion engine is made available which is equipped with devices for phase adjustment of the camshafts, referred to below for short as phase shifters, that is to say for adjusting the valve control times with respect to the crankshaft, and with an intake manifold pressure sensor which is often present in internal combustion engines. At this reference internal combustion engine, pressure oscillations in the intake manifold at different set valve control times are measured by means of the intake manifold pressure sensor during operation, and the corresponding pressure oscillation signals are stored for further processing.

Using a fast Fourier transformation (FFT), the phase angles for an individual selected signal frequency for the various valve control times, that is to say for various phase positions, which can be set by means of the phase shifter, of the camshaft of the inlet valves are now determined from the determined pressure oscillation signals. The phase position of the respective valve control time, the respectively set phase adjustment of the camshaft, are referred to below as IV_VCP_X (Intake Valve Valve Camshaft Position). The X which is appended to this designation denotes the respective phase adjustment of the valve control time with respect to the reference position without a phase adjustment IV_VCP_0 in ° CA (degrees crankshaft angle) which corresponds on the real engine to the mechanical stop of the phase shifters and is therefore uniquely defined.

The determined phase angle of the selected signal frequency in the case of IV_VCP_0 without phase adjustment, e.g., in the case of 0° phase adjustment, is then defined as a reference for the respectively considered signal frequency and referred to below as "Phase_Zero_Reference-Pattern" (P_Z_RP).

The respectively determined phase angle in the case of phase adjustment of e.g. IV_VCP_X where X=1, 2, 4, 7 or 10 is referred to analogously as "Phase_X_Reference-Pattern" (P_X_RP), where X stands for the shift of the control time in ° CA (degrees crankshaft angle) with respect to the reference, IV_VCP_0. The phase angle shift between IV_VCP_0 and the respective phase angle at the further control times for the respectively selected signal frequency according to the scheme P_X_RP-P_Z_RP is now calculated.

According to this scheme, for example the distance between the phase angle of the reference control time (IV_VCP_0) and the phase angle at the control time IV_VCP_10 adjusted by 10° CA is then calculated. This distance is subsequently divided by the selected adjustment of the control time (in this case 10° CA). The value which is obtained in this way therefore specifies the amount or the increment by which the phase angle of the selected signal frequency changes if the valve control time is adjusted by 1° CA, and is referred to below as "Increment-Phase-Offset-Value" (IPOV).

In the following equation 1) this calculation is illustrated once more:

$$IPOV = (P\_10\_RP - P\_Z\_RP)/10 \quad \text{Equation 1):}$$

The linear approach via the calculated value IPOV therefore constitutes a translation possibility between the phase angle shift and the control time shift (for the corresponding signal frequency).

By using the value IPOV it is then possible to determine the exact valve control times at the series-production internal combustion engines of the same design and dimensioning on the basis of the pressure oscillation signal measured in the intake manifold. This is given below by way of example:

The firstly unknown valve control time of the series-production internal combustion engine corresponds to the value IV_VCP_X-SM, where X in this case is the unknown variable of the valve control time shift, that is to say the phase error, which is based, for example, on tolerances or wear, and the extension SM characterizes the series-production internal combustion engine.

The increment value IPOV for the conversion ratio for the respective selected signal frequency is known from the consideration, explained above, on the reference internal combustion engine.

Then, the phase angle of the selected signal frequency of the pressure oscillation signal must firstly be determined in the intake manifold of the series-production internal combustion engine. Said signal frequency is referred to below by analogy with the designations selected above as P_X_RP-SM.

The calculation of the individual valve control times IV_VCP is carried out according to the linear model function illustrated in equation 2).

$$IV\_VCP\_X\text{-}SM = [(P\_X\_RP\text{-}SM - P\_Z\_RP)/IPOV] \quad \text{Equation 2):}$$

where P_Z_RP denotes, as already presented above, the phase angle of the selected signal frequency at IV_VCP_0 without phase adjustment, that is to say at 0° phase adjustment of the reference internal combustion engine.

It is apparent that given a suitable selection of particularly well suited signal frequencies for determining the phase angles the accuracy of the method can be increased.

The single FIGURE is a drawing showing an example arrangement of portions of an internal combustion engine incorporating teachings of the present disclosure as described above.

The teachings of the present disclosure make it possible to identify and quantify the deviations mentioned at the beginning between a reference engine and all the series-production engines of the same series. As a result, adaptation can be carried out in the control unit and an improvement can be achieved in the calculation of the taken-in fresh gas charge (elimination of the phase offset in the control times). This results in advantages with respect to emissions, consumption, smooth running, power, regulation capability and the control of the engine.

What is claimed is:

1. A method for controlling an internal combustion engine based on valve control times of a series-production internal combustion engine, the method comprising:
   measuring dynamic pressure oscillations in an inlet section or an outlet section of a reference internal combustion engine during reference valve control times to determine reference phase angles of selected signal frequencies of the pressure oscillation signal, in each case over a working cycle during the control time without a control time shift and during at least one further control time having a defined reference control time shift;

determining at least one phase angle for the control time without a control time shift and at least one phase angle for the at least one further control time using a discrete Fourier transformation for the selected signal frequencies of the pressure oscillations;

storing the reference phase angles and reference valve control times on an engine control unit of the series-production internal combustion engine;

measuring dynamic pressure oscillations in an inlet section or an outlet section of the series-production internal combustion engine;

determining a crankshaft-position feedback signal;

determining the phase angles of selected signal frequencies of the measured pressure oscillations based at least in part on the measured pressure oscillations and the crankshaft position feedback signal using discrete Fourier transformation, wherein the selected signal frequencies correspond to an intake frequency of the internal combustion engine and at least one integer multiple of the intake frequency;

determining the valve control times of the respective series-production internal combustion engine based at least in part on the determined phase angles, reference phase angles, and reference valve control times with the same signal frequencies of the pressure oscillations of the reference internal combustion engine or of a model function derived therefrom;

comparing the determined valve control times with the reference valve control times;

correcting the determined valve control times based on the reference valve control times; and adjusting valve control timing of the series-production internal combustion engine for operation based on the corrected valve control times.

2. The method as claimed in claim 1, wherein a model function which models the relationship between the phase angles of the selected signal frequencies of the pressure oscillation signal and the valve control times is derived from the reference phase angles of the selected signal frequencies of the pressure oscillation signal and the assigned reference valve control times.

3. The method as claimed in claim 2, further comprising:

measuring the dynamic pressure oscillations in the inlet section or outlet section of the respective series-production internal combustion engine;

determining phase angles using a discrete Fourier transformation for the selected signal frequencies of the pressure oscillations; and determining the valve control times according to the model function:

$$StZ\_SeMo\_Act = StZ\_RefMo\_0 + (StZ\_RefMo\_RefV - StZ\_RefMo\_0) * ((PhW\_SeMo\_Act - PhW\_RefMo\_0)/(PhW\_RefMo\_RefV - PhW\_RefMo\_0));$$

wherein $StZ\_SeMo\_Act$ represents an unknown inlet control time, $StZ\_RefMo\_0$ represents the dynamic pressure oscillations measured with known inlet control times without a control time shift, $StZ\_RefMo\_RefV$ represents the dynamic pressure oscillations measured with valve control times adjusted by a known reference control time shift, $PhW\_RefMo\_0$ represents a phase angle for $StZ\_RefMo\_0$, $PhW\_SeMo\_Act$ represents a phase angle of $StZ\_SeMo\_Act$, and $PhW\_RefMo\_RefV$ represents a phase angle for $StZ\_RefMo\_RefV$.

4. The method as claimed in claim 1, wherein the selected signal frequencies include the intake frequency and further multiples of the intake frequency.

5. The method as claimed in claim 1, wherein the dynamic pressure oscillations are measured using a series production type pressure sensor in the intake manifold.

6. The method as claimed in claim 1, wherein the crankshaft-position feedback signal is determined with a gearwheel and a Hall sensor.

7. The method as claimed in claim 1, wherein further control variables or control routines are adapted to the determined valve control times in the engine controller.

* * * * *